US009825704B2

(12) United States Patent
Kido et al.

(10) Patent No.: US 9,825,704 B2
(45) Date of Patent: *Nov. 21, 2017

(54) MODULATION DEVICE AND LIGHTING DEVICE

(71) Applicant: Panasonic Intellectual Property Management Co., Ltd., Osaka (JP)

(72) Inventors: Shojirou Kido, Osaka (JP); Yoshihiko Matsukawa, Nara (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/160,089

(22) Filed: May 20, 2016

(65) Prior Publication Data

US 2016/0352424 A1 Dec. 1, 2016

(30) Foreign Application Priority Data

Jun. 1, 2015 (JP) .................................. 2015-111488

(51) Int. Cl.
| H04B 10/00 | (2013.01) |
| H04B 10/116 | (2013.01) |
| H04B 10/40 | (2013.01) |
| H04B 10/80 | (2013.01) |

(52) U.S. Cl.
CPC ........... *H04B 10/116* (2013.01); *H04B 10/40* (2013.01); *H04B 10/808* (2013.01)

(58) Field of Classification Search
USPC ........................................................ 398/172
See application file for complete search history.

(56) References Cited

U.S. PATENT DOCUMENTS

| 6,865,347 B2* | 3/2005 | Perkins | ..................... G01S 1/70 398/130 |
| 7,006,768 B1* | 2/2006 | Franklin | ............ H04B 10/1149 398/115 |

(Continued)

FOREIGN PATENT DOCUMENTS

JP 2013-110599 A 6/2013

OTHER PUBLICATIONS

Non-Final Office Action issued in related U.S. Appl. No. 15/167,385, dated Mar. 23, 2017.

*Primary Examiner* — Agustin Bello
(74) *Attorney, Agent, or Firm* — McDermott Will & Emery LLP

(57) ABSTRACT

A modulation device includes: a modulation ID signal generator that generates a first ID signal including first identification information; a reception terminal capable of receiving a second ID signal including second identification information; a transmission terminal capable of transmitting the first ID signal and the second ID signal out of the modulation device; a detector that detects a received state in which the second ID signal is received by the reception terminal and an unreceived state in which the second ID signal is not received by the reception terminal; and a switch circuit that outputs the first ID signal to the transmission terminal when the detector detects the unreceived state and outputs the second ID signal to the transmission terminal when the detector detects the received state.

9 Claims, 11 Drawing Sheets

(56) References Cited

U.S. PATENT DOCUMENTS

| | | | | |
|---|---|---|---|---|
| 8,457,502 B2* | 6/2013 | Ryan | ............... | G01S 1/70 |
| | | | | 398/172 |
| 8,660,436 B2* | 2/2014 | Schenk | ............... | H05B 37/0272 |
| | | | | 315/294 |
| 8,866,391 B2* | 10/2014 | Ganick | ............... | G01C 21/206 |
| | | | | 315/120 |
| 9,014,564 B2* | 4/2015 | Roberts | ............... | H04B 10/116 |
| | | | | 382/280 |
| 9,166,685 B2 | 10/2015 | Kido et al. | | |
| 2010/0254712 A1* | 10/2010 | Linnartz | ............... | H04B 10/1149 |
| | | | | 398/172 |
| 2013/0028612 A1* | 1/2013 | Ryan | ............... | G01S 1/70 |
| | | | | 398/172 |
| 2013/0141554 A1* | 6/2013 | Ganick | ............... | G01S 1/70 |
| | | | | 348/61 |
| 2013/0272717 A1* | 10/2013 | Deguchi | ............... | H04B 10/116 |
| | | | | 398/154 |
| 2013/0336662 A1* | 12/2013 | Murayama | ............... | H04B 10/116 |
| | | | | 398/130 |
| 2014/0139744 A1* | 5/2014 | Ryan | ............... | G01C 21/206 |
| | | | | 348/607 |
| 2014/0199082 A1* | 7/2014 | Iizuka | ............... | H04B 10/116 |
| | | | | 398/172 |
| 2014/0321860 A1 | 10/2014 | Kido et al. | | |
| 2015/0304031 A1 | 10/2015 | Lee et al. | | |
| 2015/0372753 A1* | 12/2015 | Jovicic | ............... | H04B 10/116 |
| | | | | 398/172 |
| 2016/0191158 A1* | 6/2016 | Aoyama | ............... | H04B 10/1149 |
| | | | | 398/172 |
| 2016/0191159 A1* | 6/2016 | Aoyama | ............... | H04N 21/436 |
| | | | | 398/172 |
| 2016/0352424 A1* | 12/2016 | Kido | ............... | H04B 10/116 |
| 2016/0359562 A1* | 12/2016 | Matsukawa | ............... | H04B 10/116 |

\* cited by examiner

MODULATION DEVICE AND LIGHTING DEVICE

CROSS REFERENCE TO RELATED APPLICATION

This application claims the benefit of priority of Japanese Patent Application Number 2015-111488 filed on Jun. 1, 2015, the entire content of which is hereby incorporated by reference.

BACKGROUND

1. Technical Field

The present disclosure relates to a modulation device and a lighting device.

2. Description of the Related Art

A plurality of lighting devices capable of visible light communication may be arranged such that the lighting ranges thereof partially overlap. In this case, if the communication signals transmitted by the lighting devices are not in synchronization, the signals may interfere with one another in the region of overlap. A known technique to circumvent this interference is to connect, as a master device, a visible light communication signal output circuit to the plurality of lighting devices to cause the lighting devices to perform visible light communication in synchronization based on a modulation signal output from the visible light communication signal output circuit (for example, see Japanese Unexamined Patent Application Publication No. 2013-110599).

SUMMARY

However, when a master device is required, space for installation of the master device is required, which impedes space-saving efforts.

An object of the present disclosure is thus to achieve synchronized visible light communication with a plurality of lighting devices without the use of a master device, to save space.

According to one aspect of the present disclosure, a modulation device modulates current to be supplied to a lamp of a lighting device capable of visible light communication, and includes: a modulation ID (identification) signal generator that generates a first ID signal, including first identification information, for modulating the current; a reception terminal for receiving, from outside the modulation device, a second ID signal, including second identification information, for modulating the current; a transmission terminal for transmitting the first ID signal and the second ID signal out of the modulation device; a detector that detects a received state in which the second ID signal is received by the reception terminal and an unreceived state in which the second ID signal is not received by the reception terminal; and a switch circuit that outputs the first ID signal to the transmission terminal when the detector detects the unreceived state and outputs the second ID signal to the transmission terminal when the detector detects the received state.

According to another aspect of the present disclosure, the lighting device includes the above-described modulation device and a lamp.

Accordingly, it is possible to synchronize communication signals of a plurality of lighting devices capable of visible light communication, without the use of a master device, and thereby save space.

BRIEF DESCRIPTION OF DRAWINGS

The figures depict one or more implementations in accordance with the present teaching, by way of examples only, not by way of limitations. In the figures, like reference numerals refer to the same or similar elements.

DETAILED DESCRIPTION OF THE EMBODIMENTS

Underlying Knowledge of Inventors

Figure 1:
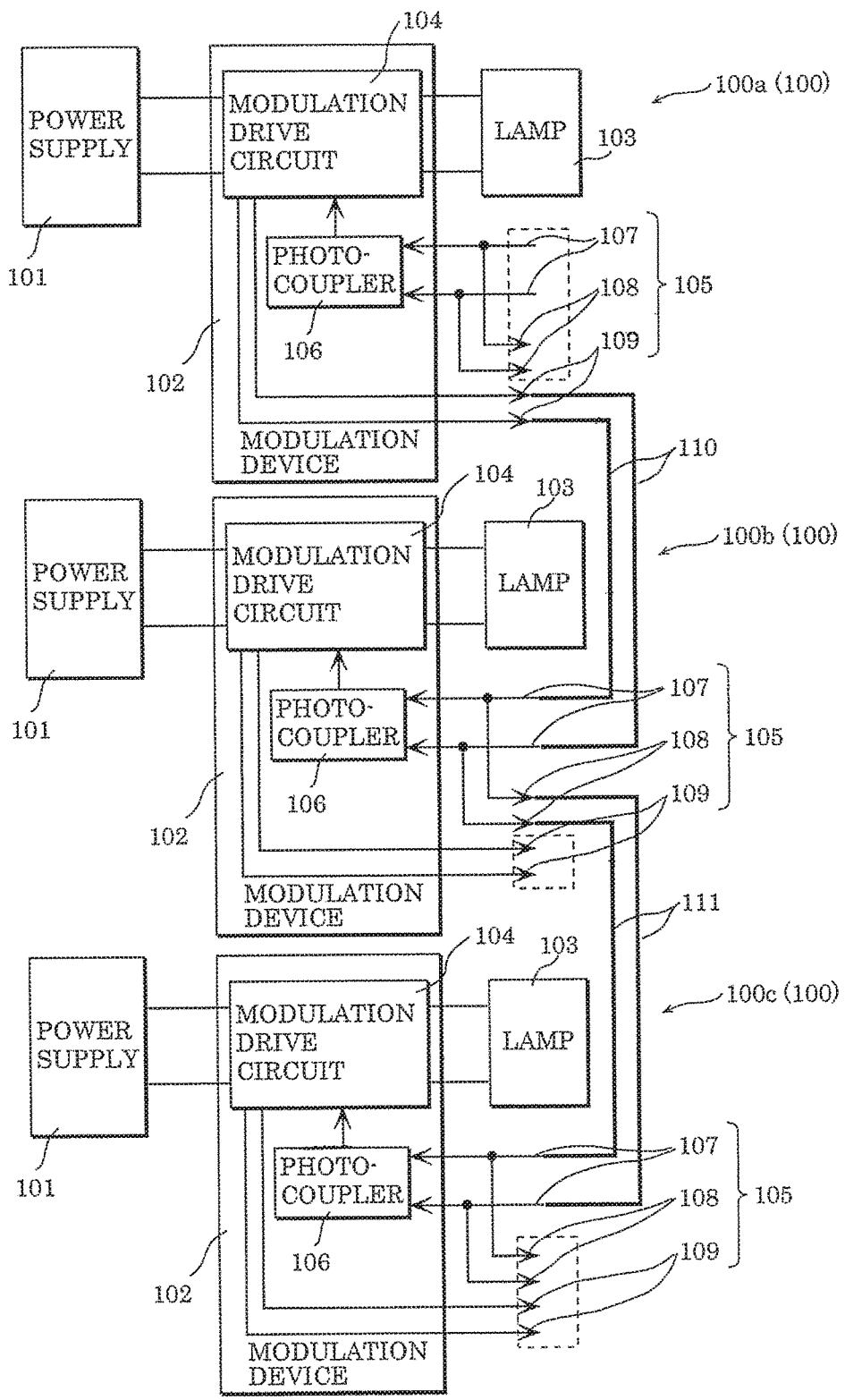
FIG. 1 schematically illustrates three electrically connected conventional lighting devices equipped with modulation devices.

In order to save space, the Inventors considered implementing a modulation device for generating modulated signals inside a lighting device itself. FIG. 1 schematically illustrates three electrically connected lighting devices equipped with modulation devices.

As illustrated in FIG. 1, lighting device 100 includes power supply 101, modulation device 102, and lamp 103. Power supply 101 supplies power to modulation device 102. Modulation device 102 modulates pulses of visible light from lamp 103 by switching the current supplied, to lamp 103 from power supply 101 on and off in accordance with a pulse modulation signal.

Modulation device 102 includes modulation drive circuit 104, terminal group 105, and photocoupler 106.

Modulation drive circuit 104 has a function of generating its own ID signal (the first ID signal), and generates a pulse modulation signal in accordance with the internally generated first ID signal or an external ID signal input from outside modulation device 102 (the second ID signal).

Terminal group 105 includes three pairs of terminals—first terminal group 107, second terminal group 108, and third terminal group 109.

First terminal group 107 includes terminals into which the external second ID signal is input. Second terminal group 108 includes terminals from which the second ID signal input into first terminal group 107 is output to another lighting device 100. Third terminal group 109 includes terminals from which the first ID signal is output to another lighting device 100.

Photocoupler 106 outputs, to modulation drive circuit 104, the second ID signal input into first terminal group 107.

In FIG. 1, the three lighting devices 100 have the same structure and are connected in series. Third terminal group 109 of first lighting device 100a located farthest upstream and first terminal group 107 of second lighting device 100b located immediately downstream first lighting device 100a are electrically connected via lines 110. Second terminal group 108 of second lighting device 100b and first terminal group 107 of third lighting device 100c located farthest downstream are electrically connected via lines 111: First lighting device 100a located farthest upstream is the master device, and second lighting device 100b and third lighting device 100c located downstream first lighting device 100a are slave devices.

The first ID signal generated by modulation drive circuit 104 of first lighting device 100a is input into first terminal group 107 of second lighting device 100b as the second ID signal via third terminal group 109 of first lighting device 100a and lines 110.

When the first ID signal from first lighting device 100a is input into second lighting device 100b as the second ID signal, the first ID signal is input into modulation drive circuit 104 of second lighting device 100b from first 1b terminal group 107 via photocopier 106. Moreover, the first ID signal is input into first terminal group 107 of third lighting device 100c from second terminal group 108 of second lighting device 100b via lines 111.

When the first ID signal from first lighting device 100a is input into third lighting device 100c as the second ID signal, the first ID signal is input into modulation drive circuit 104 of third lighting device 100c from first terminal group 107 via photocoupler 106.

In this way, since the first ID signal generated by first lighting device 100a is input into second lighting device 100b and third lighting device 100c, in all three lighting devices 100, pulse modulation signals are generated in accordance with the same ID signal to achieve synchronization.

Terminals 107 through 108 that are not connected to lines 110 and 111 (the terminals enclosed in dashed lines in FIG. 1) are riot used after installation of lighting device 100. Particularly when lighting devices 100 are used outdoors, unused terminals require waterproofing, which costs money and is time consuming.

As such, hereinafter, an exemplary embodiment of a modulation device included in a lighting device designed to save space and reduce terminals that are useless after installation will be described.

Embodiment 1

Hereinafter exemplary embodiments will be described in detail with reference to the drawings. The exemplary embodiments described below are general or specific examples. The numerical values, shapes, materials, elements, the arrangement and connection of the elements, steps, the order of the steps, etc., in the following exemplary embodiments are mere examples, and therefore are not intended to limit the inventive concept. Therefore, among the elements in the following exemplary embodiment, those not recited in any of the independent claims defining the most generic part of the inventive concept are described as arbitrary elements. Moreover, the drawings are schematic drawings, and are not necessarily precise illustrations.

Overall Configuration

Figure 2:
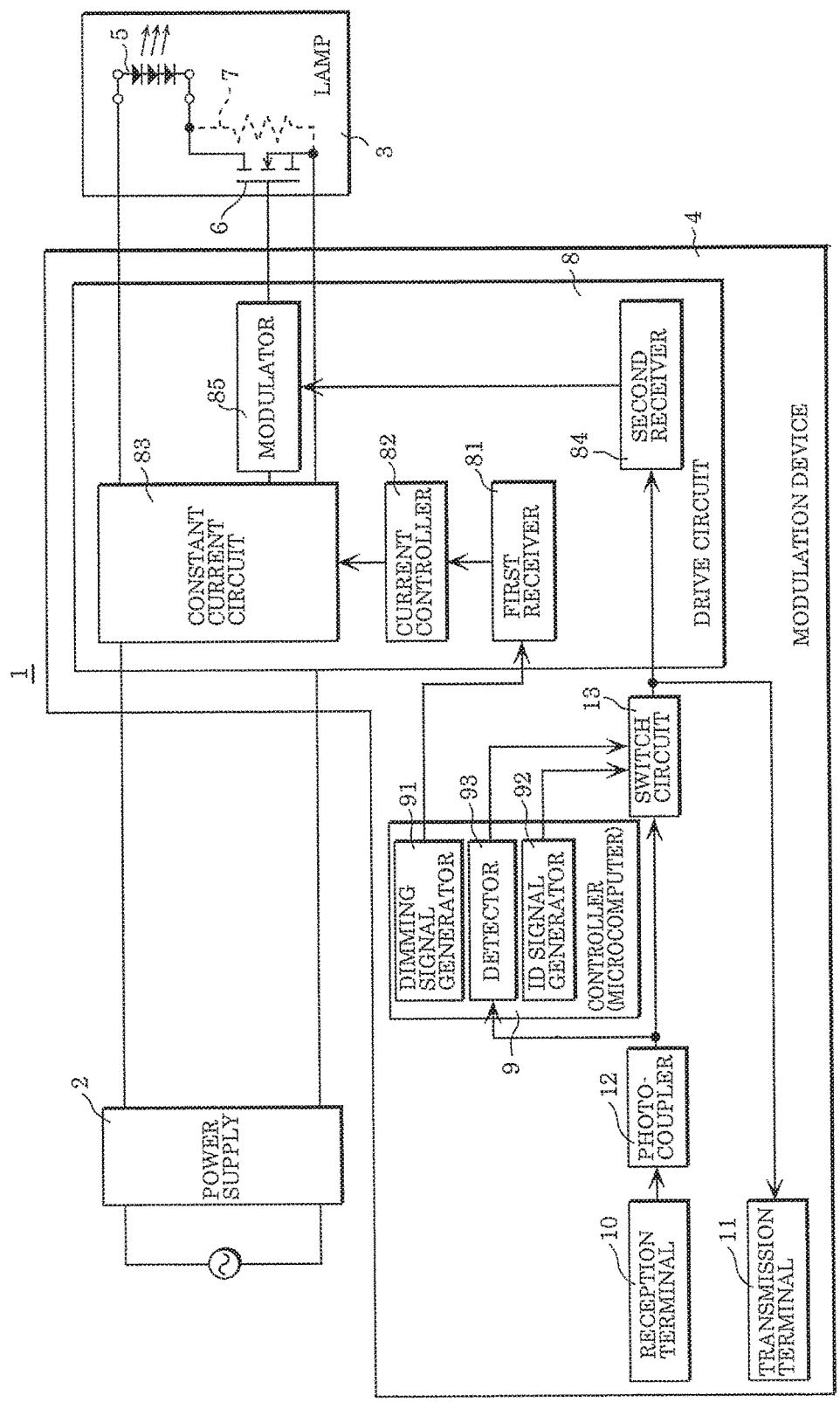
FIG. 2 is a block diagram illustrating an example of a configuration of a lighting device according to Embodiment 1.

Hereinafter, the lighting device according to an exemplary embodiment will be described. FIG. 2 is a block diagram illustrating an example of a configuration of the lighting device according to Embodiment 1.

As illustrated in FIG. 2, lighting device 1 is capable of visible light communication and includes power supply 2, lamp 3, and modulation device 4.

Power supply 2 supplies power to modulation device 4. More specifically, power supply 2 is an alternating current-direct current (AC-DC) converter, and includes a power factor correction (ITC) circuit and a harmonic reduction circuit.

Lamp 3 includes light source 5, switch 6, and resistor 7.

Light source 5 is, for example, a panel light. Light source 5 includes, for example, a light-transmissive resin panel, and a plurality of light-emitting diodes (LEDs). The plurality of LEDs emit light into the light-transmissive resin panel via the sides and back surface of the light-transmissive resin panel, whereby the entire surface of the light-transmissive resin panel is illuminated. For example, the light-transmissive resin panel is used as a sign, on which, for example, traffic information markings are illustrated. Note that light source 5 is not limited to the combination of the light-transmissive resin panel and the plurality of LEDs; an organic electroluminescent (EL) panel can be used, and moreover, any light panel capable of visible light communication can also be used.

Switch 6 turns on and off the supply of current from modulation device 4 to lamp 3. Turning on and off the current modulates the pulses of the visible light from light source 5. Pulse modulation is, for example, 4 pulse position modulation (4-PPM) as defined by Japan Electronics and Information Technology Industries Association (JEITA) standard CP-1222 (Visible Light ID System). With 4-PPM, a single symbol duration is 0.41 mS, and a single slot duration is 0.104 mS. A single symbol represents two bits, so 4-PPM has a bit rate of 4.8 kbps. Pulse modulation according to Embodiment 1 is an inversion of the above-described 4-PPM, i.e., inverted 4-PPM (inverted 4 pulse position modulation), in order to increase the ratio of ON time.

Resistor 7 is connected in parallel to switch 6, and connected in series to light source 5. Resistor 7 is capable of passing current to light source 5 when switch 6 is off. In pulse modulation, in accordance with on and off states of switch 6, light source 5 is rapidly switched between two states—dimmed light emission and bright light emission. The level of "dimmed light emission" is determined by the resistance of resistor 7. When visible light is to be modulated 100% (i.e., when "dimmed light emission" is "zero light emission"), resistor 7 may be omitted. Note that an LED may be included in place of resistor 7.

Modulation device 4 modulates current supplied from power supply 2 and supplies the modulated current to lamp 3. More specifically, modulation device 4 includes drive circuit 8, controller 9, reception terminal 10, transmission terminal 11, photocoupler 12, and switch circuit 13.

Drive circuit 8 supplies power of a value determined by the dimming level of light source 5 in accordance with an instruction (an analog dimming signal) from controller 9. Drive circuit 8 also performs pulse modulation in accordance with an instruction (a pulse modulation signal) input via switch circuit 13.

More specifically, drive circuit 8 includes first receiver 81, current controller 82, constant current circuit 83, second receiver 84, and modulator 85 (the modulator circuit).

First receiver 81 receives an analog dimming signal from controller 9, and instructs current controller 82 with a dimming level.

Current controller 82 instructs constant current circuit 83 of the magnitude of constant current supplied to light source 5 by constant current circuit 83, in accordance with the dimming level instructed by first receiver 81.

Constant current circuit 83 supplies, to light source 5, constant current of the magnitude instructed by current controller 82.

Second receiver 84 receives an ID signal for visible light communication use input via switch circuit 13, changes the level of the received ID signal, and outputs the ID signal to modulator 85. An 1D signal is a pulse modulation signal for modulating current supplied to light source 5 of lamp 3, and includes an ID, which is identification information.

Modulator 85 generates, based on the ID signal from second receiver 84, a switch drive signal that switches switch 6 on and off. Modulator 85 modulates current supplied to lamp 3 by outputting the switch drive signal to switch 20.

Controller 9 is a microcomputer that instructs drive circuit 8 with the analog dimming signal and the first ID signal as the ID signal. Moreover, controller 9 detects whether reception terminal 10 has received an external ID signal (the second ID signal), and outputs the result of the detection to switch circuit 13. More specifically, controller 9 includes dimming signal generator 91, ID signal generator 92 (the modulation ID signal generator), and detector 93. Dimming signal generator 91 generates the above-described analog dimming signal, which is a signal indicating a dimming level and a constant current magnitude, and outputs the analog dimming signal to first receiver 81. ID signal generator 92 generates the first ID signal including its own ID, which is identification information, and outputs the first ID signal to switch circuit 13. Detector 93 is electrically connected to reception terminal 10, and detects a received state in which reception terminal 10 has received, the second ID signal and an unreceived state in which reception terminal 10 has not received the second ID signal. Detector 93 may directly detect the received state and the unreceived state and, alternatively, may directly detect one of the received state and the unreceived state to thereby indirectly detect the other. Detector 93 is electrically connected to switch circuit 13 and outputs the results of the detection of switch circuit 13.

Figure 5:
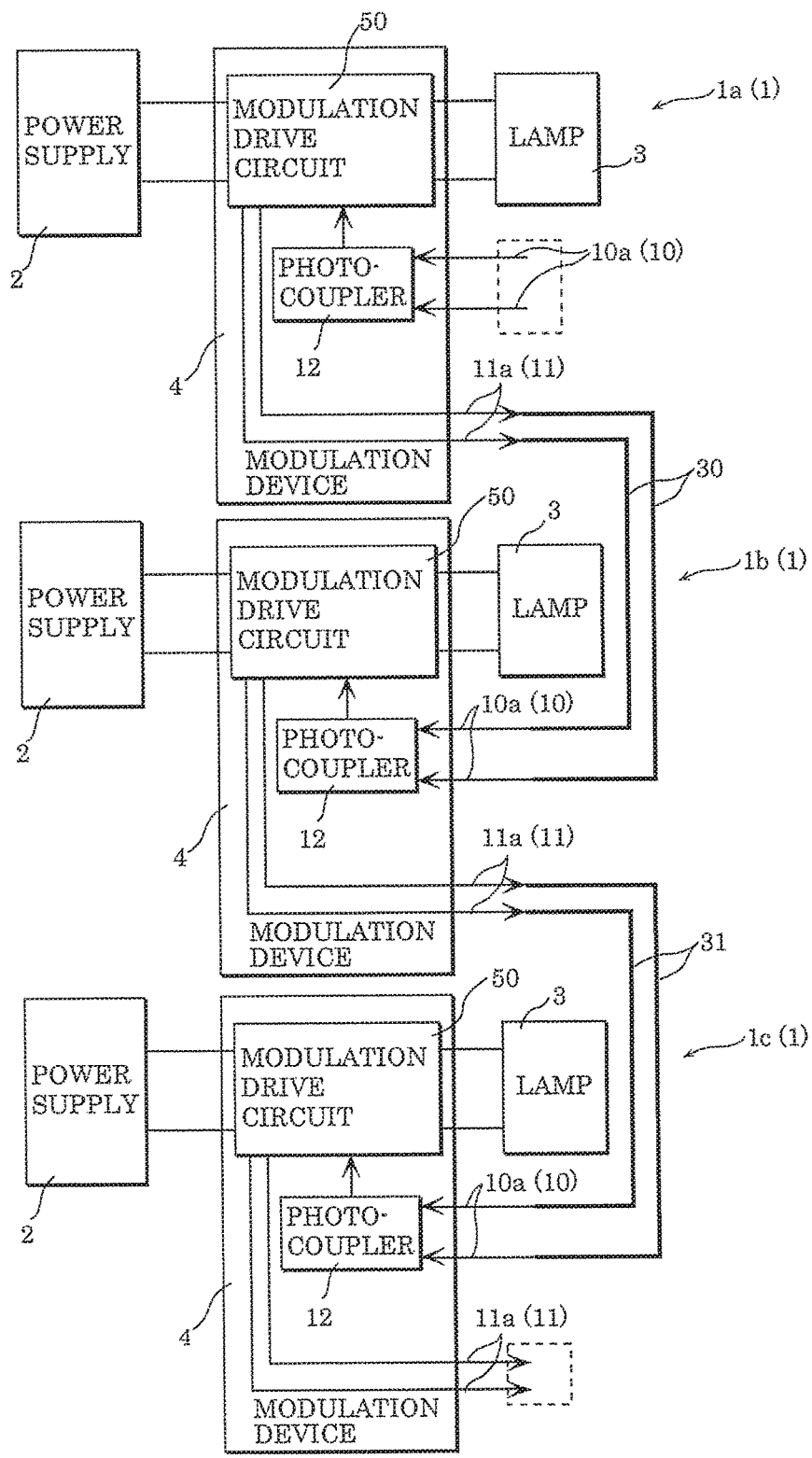
FIG. 5 schematically illustrates three electrically connected lighting devices according to Embodiment 1.

Reception terminal 10 is capable of receiving the external second ID signal, and includes terminal pair 10a (see FIG. 5).

Transmission terminal 11 is capable of transmitting out of modulation device 4 the first ID signal and the second ID signal, and includes terminal pair 11a (see FIG. 5). More specifically, transmission terminal 11 transmits out of modulation device 4 one of the first ID signal and the second ID signal output from switch circuit 13.

Photocoupler 12 transmits the second ID signal received by reception terminal 10 to detector 93 and switch circuit 13. More specifically, photocoupler 12 is disposed along a transmission path connecting reception terminal 10 and detector 93 and a transmission path connecting reception terminal 10 and switch circuit 13.

Based on the detection result of detector 93, switch circuit 13 selectively outputs, as an output signal, one of the first ID signal and the second ID signal to transmission terminal 11.

When detector 93 detects the unreceived state, switch circuit 13 outputs the first ID signal to transmission terminal 11 as the output signal, and when detector 93 detects the received state, switch circuit 13 outputs the second ID signal to transmission terminal 11 as the output signal. More specifically, switch circuit 13 is electrically connected to ID signal generator 92, transmission terminal 11, photocoupler 12, and second receiver 84. When detector 93 detects the unreceived state, switch circuit 13 outputs, as the output signal, to transmission terminal 11 and second receiver 84, the first ID signal generated by ID signal generator 92. In contrast, when detector 93 detects the received state, switch circuit 13 outputs, as the output signal, to transmission terminal 11 and second receiver 84, the second ID signal input from photocoupler 12. With this, one of the first ID signal and the second ID signal is input into modulator 85 via second receiver 84.

Modulation Device Operations

Next, operations performed by modulation device 4 will be described.

Figure 3:
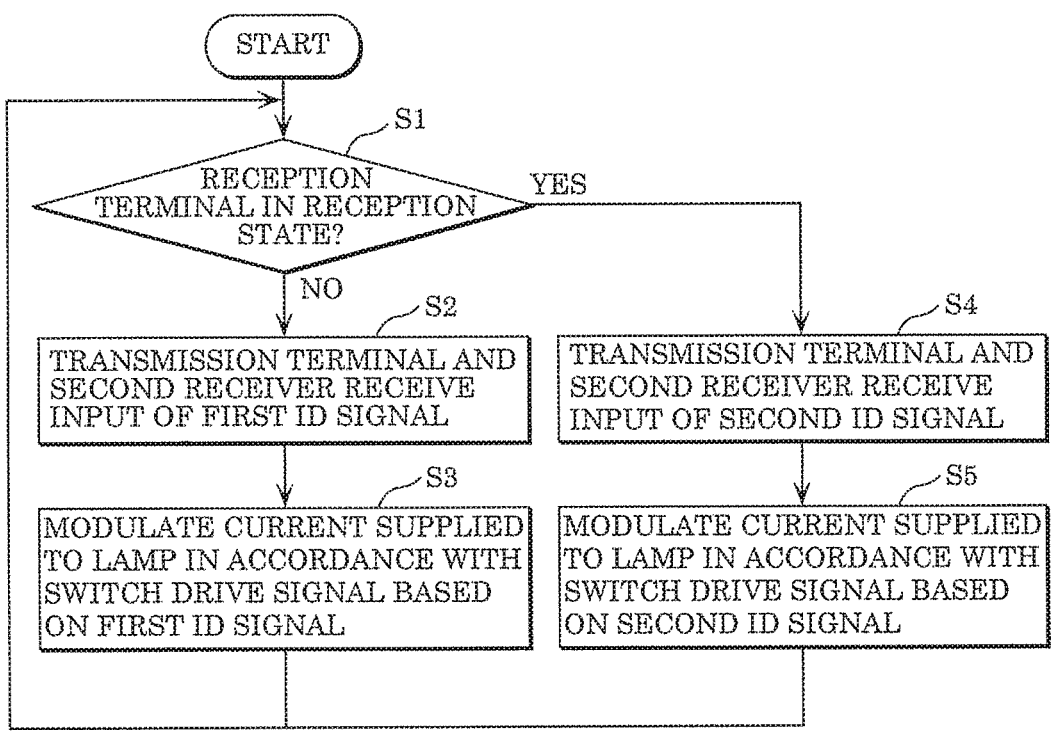
FIG. 3 is a flow chart of operations performed by a modulation device according to Embodiment 1.

FIG. 3 is a flow chart of operations performed by modulation device 4.

In step S1, detector 93 of controller 9 detects whether reception terminal 10 is in the received state or the unreceived state, and when the result of the detection is the unreceived state (NO in step S1), processing proceeds to step S2, and when the result of the detection is the received state (YES in step S1), processing proceeds to step S4.

In step S2, switch circuit 13 outputs, to transmission terminal 11 and second receiver 84, the first ID signal as the output signal.

In step S3, modulator 85 generates a switch drive signal based on the first ID signal input into modulator 85 from second receiver 84 to modulate current supplied to lamp 3. In this case, the first ID signal is output out of modulation device 4 from transmission terminal 11.

In step S4, switch circuit 13 outputs, to transmission terminal 11 and second receiver 84, the second ID signal as the output signal.

In step S5, modulator 85 generates a switch drive signal based on the second ID signal input into modulator 85 from second receiver 84 to modulate current supplied to lamp 3. In this case, the second ID signal is output out of modulation device 4 from transmission terminal 11.

Figure 4:
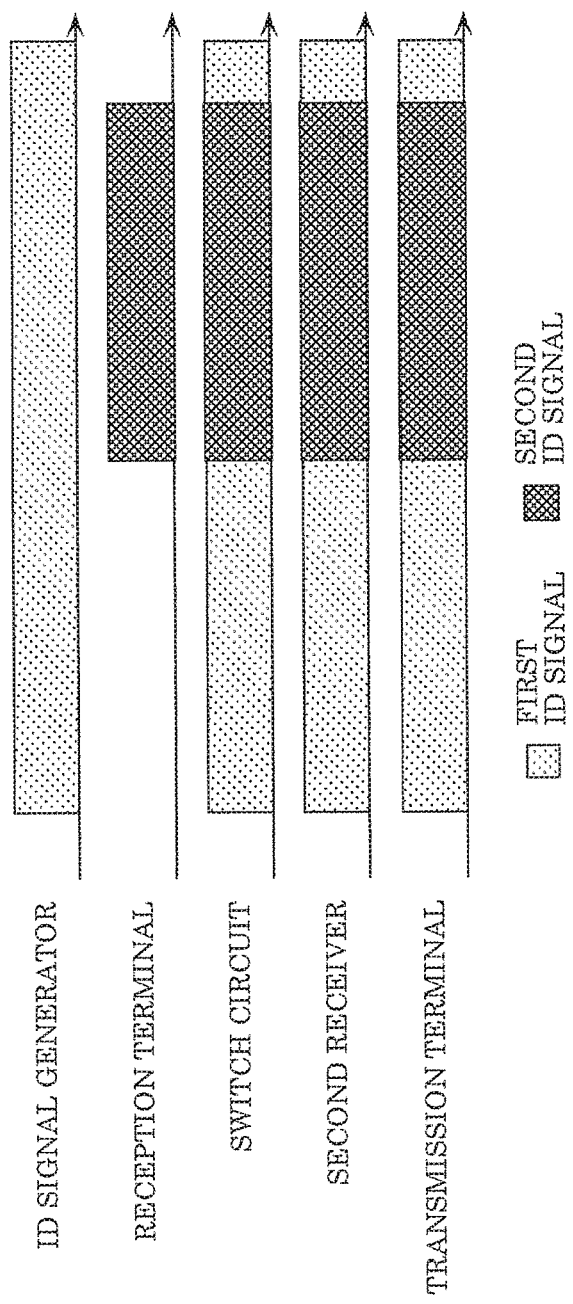
FIG. 4 illustrates output signal timing for each element when the modulation device according to Embodiment 1 operates.

FIG. 4 illustrates output signal timing for the elements when modulation device 4 operates. As illustrated in FIG. 4, ID signal generator 92 generates and outputs the first ID signal.

Reception terminal 10 outputs the external second ID signal only upon reception of the external second ID signal.

When the detection result of detector 93 is the unreceived state, switch circuit 13 outputs the first ID signal to transmission terminal 11 and second receiver 84. However, when the detection result of detector 93 is the received state, switch circuit 13 outputs the second ID signal to transmission terminal 11 and second receiver 84. As a result, second receiver 84 and transmission terminal 11 receive the same ID signal at the same time.

Lighting Device Connection Example

Next, an example will be given when three of the above-described lighting devices 1 are electrically connected to one another.

FIG. 5 schematically illustrates three electrically connected lighting devices. Note that in FIG. 5, for the sake of convenience, drive circuit 8, controller 9, and switch circuit 13 are illustrated as modulation drive circuit 50.

In FIG. 5, the three lighting devices 1 have the same structure and are connected in series. Terminal pair 11a of transmission terminal 11 of first lighting device 1a located farthest upstream and terminal pair 10a of reception terminal 10 of second lighting device 1b located immediately downstream first lighting device 1a are electrically connected via lines 30. Moreover, terminal pair 11a of transmission terminal 11 of second lighting device 1b and terminal pair 10a of reception terminal 10 of third lighting device 1c located farthest downstream are electrically connected via lines 31. With this, first lighting device 1a located furthest upstream is the master device, and second lighting device 1b and third lighting device 1c located downstream first lighting device 1a are slave devices. Note that known wiring capable of transmitting signals may be used for lines 30 and 31, but in this example, optical fiber is used due to its ability to inhibit transmission signal waveform distortion.

In first lighting device 1a, nothing is connected to reception terminal 10, and reception terminal 10 receives no input of an ID signal from other lighting devices. As such, the first ID signal generated by modulation drive circuit 50 of first lighting device 1a is input as the second ID signal into reception terminal 10 of second lighting device 1b via transmission terminal 11 of first lighting device 1a and lines 30. Moreover, a switch drive signal based on the first ID signal is input into lamp 3 of first lighting device 1a from modulation drive circuit 50.

When the second ID signal (the first ID signal from first lighting device 1a) is input into second lighting device 1b, in second lighting device 1b, the second ID signal is input into modulation drive circuit 50 from reception terminal 10 via photocoupler 12. As a result, detector 93 of second lighting device 1b detects the received state, and switch circuit 13 outputs, to transmission terminal 11 and second receiver 84, the second ID signal as the output signal. The second ID signal (the first ID signal generated by first lighting device 1a) is input into reception terminal 10 of third lighting device 1c via transmission terminal 11 of second lighting device 1b and lines 31. Moreover, a switch drive signal based on the second ID signal is input into lamp 3 of second lighting device 1b from modulation drive circuit 50.

When the second ID signal (the first ID signal generated by first lighting device 1a) is input into third lighting device 1c, in third lighting device 1c, the second ID signal is input into modulation drive circuit 50 from reception terminal 10 via photocoupler 12. As a result, detector 93 of third lighting device 1c detects the received state, and switch circuit 13 outputs, to transmission terminal 11 and second receiver 84, the second ID signal as the output signal. With this, a switch drive signal based on the second ID signal (the first ID signal generated by first lighting device 1a) is input into lamp 3 of third lighting device 1c from modulation drive circuit 50.

Thus, with the three lighting devices 1, synchronized visible light communication can be performed using the same ID signal (the first ID signal generated by first lighting device 1a).

As described above, with Embodiment 1, when detector 93 detects the unreceived state, switch circuit 13 outputs, to transmission terminal 11, the first ID signal as the output signal. Moreover, when detector 93 detects the received state, switch circuit 13 outputs, to transmission terminal 11, the second ID signal as the output signal. In this way, since the signal that is output to transmission terminal 11 switches between the first ID signal and the external second ID signal depending on whether or not the external second ID signal has been received, the same terminals can be used for transmitting both of these signals. As a result, with modulation device 4 included in lighting device 1, space can be saved and terminals that are useless after installation can be reduced.

In particular, although terminals not connected to lines 30 and 31 (terminal pair 10a of reception terminal 10 of first lighting device 1a and terminal pair 11a of transmission terminal 11 of third lighting device 1c, i.e., the terminals enclosed in dashed lines in FIG. 5) remain, the number is less than exemplified with lighting device 100 in FIG. 1. Consequently, costs and time associated with waterproofing can be reduced.

Moreover, when detector 93 detects the unreceived state, switch circuit 13 outputs the first ID signal to modulator 85. Moreover, when detector 93 detects the received state, switch circuit 13 outputs the second ID signal to modulator 85. In other words, since the external second ID signal is input into modulator 85 when the external second ID signal is received, synchronization with the other modulation devices 4 that outputted the second ID signal can be achieved.

Moreover, since modulation device 4 includes photocoupler 12 that transmits the second ID signal received by reception terminal 10 to detector 93, the second ID signal can be transmitted to detector 93 rapidly and along an electrically insulated path. Moreover, since switch circuit 13 is connected to photocoupler 12, the second ID signal can also be transmitted to switch circuit 13 rapidly and along an electrically insulated path.

Moreover, since at least one of reception terminal 10 and transmission terminal 11 is connected to optical fiber (lines 30 and 31) connected to another modulation device 4, transmission signal waveform distortion can be inhibited and electrical insulation can be secured. In particular, even if modulation device 4 connected over optical fiber is a great distance away, inhibition of transmission signal waveform distortion can still be achieved.

Embodiment 2

Figure 6:
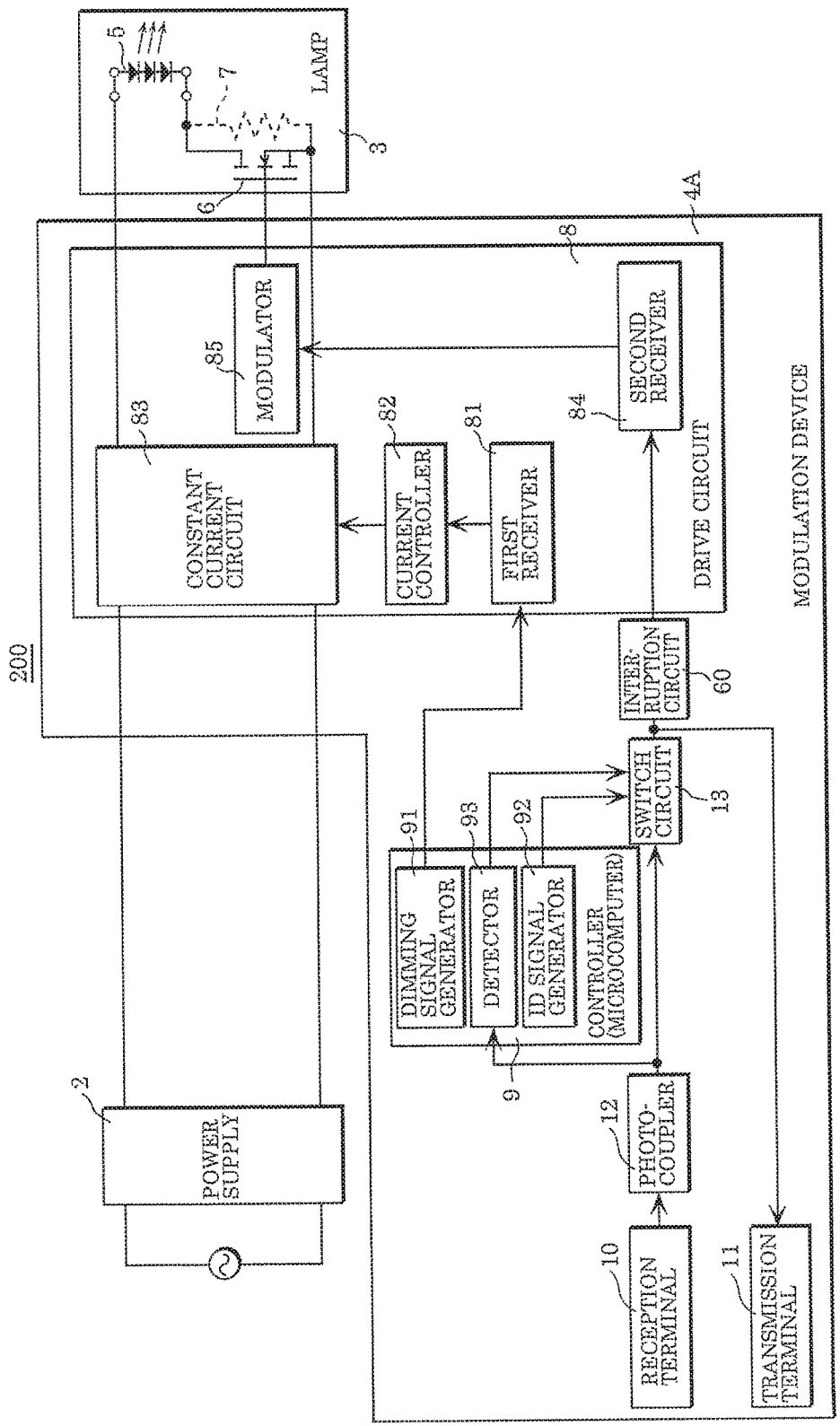
FIG. 6 is a block diagram illustrating an example of a configuration of a lighting device according to Embodiment 2.

FIG. 6 is a block diagram illustrating an example of a configuration of lighting device 200 according to Embodiment 2.

As illustrated in FIG. 6, in Embodiment 2, interruption circuit 60 has been added to the configuration of modulation device 4 according to Embodiment 1. More specifically, interruption circuit 60 interrupts a signal output from switch circuit 13 to modulator 85 via second receiver 84 in accordance with the detection result of detector 93.

Note that in the following example, elements equivalent to those in Embodiment 1 share like reference numerals and description of such elements is omitted.

Modulation device 4A according to Embodiment 2 includes interruption circuit 60.

Interruption circuit 60 is a switch circuit disposed between switch circuit 13 and second receiver 84. More specifically, interruption circuit 60 is disposed between (i) the connection point of switch circuit 13 and transmission terminal 11 and (ii) second receiver 84. Interruption circuit 60 is electrically connected to detector 93, switch circuit 13, and second receiver 84. When detector 93 detects the unreceived state, interruption circuit 60 passes a signal (the first ID signal) output from switch circuit 13 to modulator 85 via second receiver 84. In contrast, when detector 93 detects the received state, interruption circuit 60 interrupts a signal output from switch circuit 13 to modulator 85 via second receiver 84 (the second ID signal).

Modulation Device Operations

Next, operations performed by modulation device 4A will be described.

Figure 7:
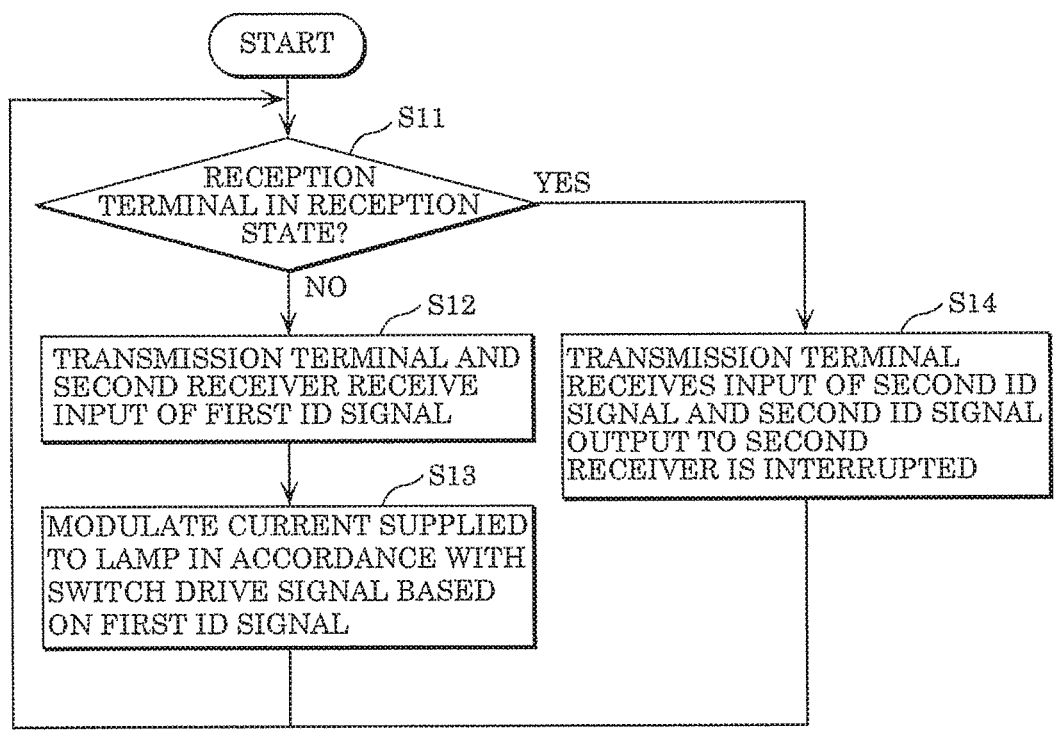
FIG. 7 is a flow chart of operations performed by a modulation device according to Embodiment 2.

FIG. 7 is a flow chart of operations performed by modulation device 4A.

In step S11, detector 93 of controller 9 detects whether reception terminal 10 is in the received state or the unreceived state, and when the result of the detection is the unreceived state (NO in step S11), processing proceeds to step S12, and when the result of the detection is the received state (YES in step S11), processing proceeds to step S14.

In step S12, switch circuit 13 outputs, to transmission terminal 11 and interruption circuit 60, the first ID signal as the output signal. In this case, since detector 93 has detected the unreceived state, interruption circuit 60 outputs, to second receiver 84, the first ID signal input from switch circuit 13, In step S13, modulator 85 generates a switch drive signal based on the first ID signal input into modulator 85 from second receiver 84 to modulate current supplied to lamp 3. In this case, the first ID signal is output out of modulation device 4A from transmission terminal 11.

In step S14, switch circuit 13 outputs, to transmission terminal 11 and interruption circuit 60, the second ID signal as the output signal. In this case, since detector 93 has detected the received state, interruption circuit 60 interrupts the second ID signal input from switch circuit 13. This interruption also interrupts the visible light communication performed by lamp 3. Note that when visible light communication is interrupted, lamp 3 may be caused to simply emit light for illumination purposes and, alternatively, may be turned off.

Figure 8:
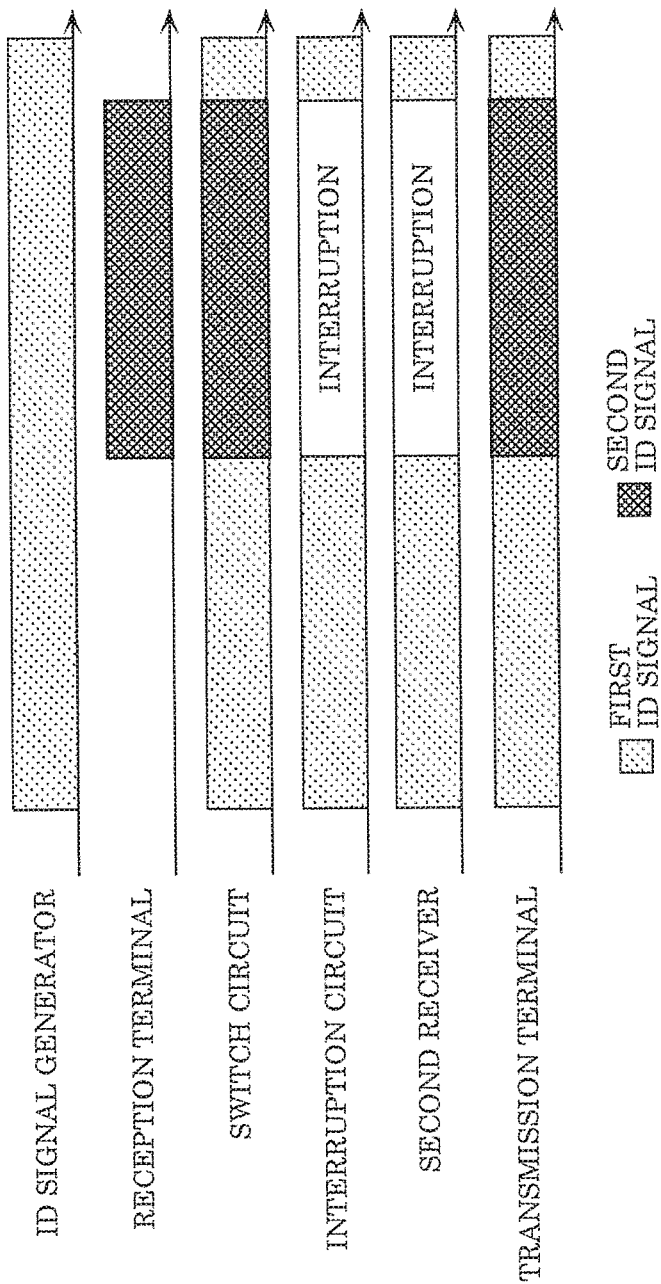
FIG. 8 illustrates output signal timing for each element when the modulation device according to Embodiment 2 operates.

FIG. 8 illustrates output signal timing for each element when modulation device 4A operates. As illustrated in FIG. 8, ID signal generator 92 generates and outputs the first ID signal.

Reception terminal 10 outputs the external second ID signal only when it receives the external second ID signal.

When the detection result of detector 93 is the unreceived state, switch circuit 13 outputs the first ID signal to transmission terminal 11 and interruption circuit 60. When the detection result of detector 93 is the received state, switch circuit 13 outputs the second ID signal to transmission terminal 11 and interruption circuit 60.

As a result, transmission terminal 11 outputs the same ID signal at the same time as switch circuit 13.

When the detection result of detector 93 is the unreceived state, interruption circuit 60 outputs the first ID signal to second receiver 84. When the detection result of detector 93 is the received, state, interruption circuit 60 interrupts the second ID signal.

As a result, second receiver 84 and interruption circuit 60 output the first ID signal at the same time, whereby the signal is interrupted at the same time.

Visible Light Communication Timing for Each Lighting Device

Next, in Embodiment 2 as well, an example will be given when three lighting devices 200 are electrically connected to one another, and the visible light communication timing for each lighting device 200 will be described.

Note that similar to the example illustrated in FIG. 5, three lighting devices 200 are connected to one another. As such, description of the connections between lighting devices 200 is omitted.

Figure 9:
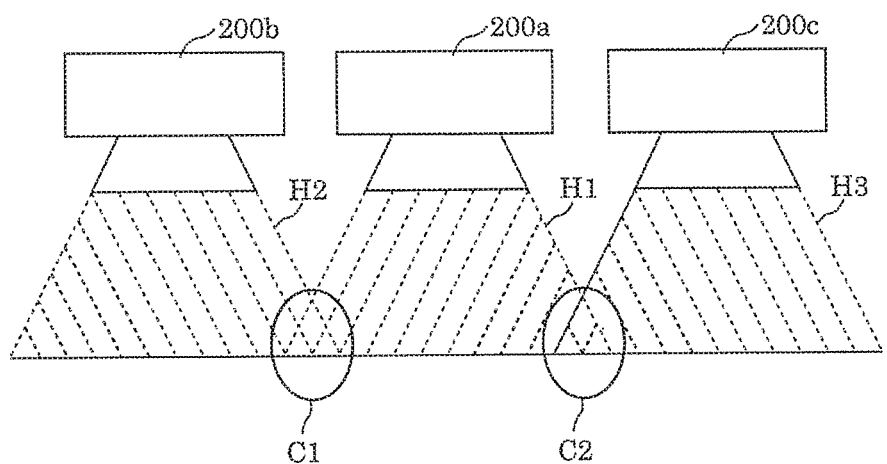
FIG. 9 schematically illustrates an arrangement example of three lighting devices according to Embodiment 2 when viewed from the side.

FIG. 9 schematically illustrates an arrangement example of three lighting devices 200 when viewed from the side.

As illustrated in FIG. 9, first lighting device 200a located farthest upstream is physically disposed between second lighting device 200b and third lighting device 200c. Here, lighting range HI of first lighting device 200a and lighting range H2 of second lighting device 200b overlap (as indicated by circle C1 in FIG. 9). Similarly, lighting range H1 of first lighting device 200a and lighting range H3 of third lighting device 200c overlap (as indicated by circle C2 in FIG. 9).

The overlapping regions indicated by circles C1 and C2 pose no problem so long as all lighting devices 200a, 200b, and 200c are performing visible light communication in synchronization based on the same ID signal. However, when each of lighting devices 200a, 200b, and 200c performs visible light communication based on a different signal, there are instances where interference occurs in the overlapping regions indicated by circles C1 and C2 and accurate visible light communication cannot be formed.

Accordingly, by preadjusting parameters related to ID signal output timing for lighting devices 200a, 200b, and 200c, the ID signals output by lighting devices 200a, 200b, and 200c can be prevented from overlapping.

Figure 10:
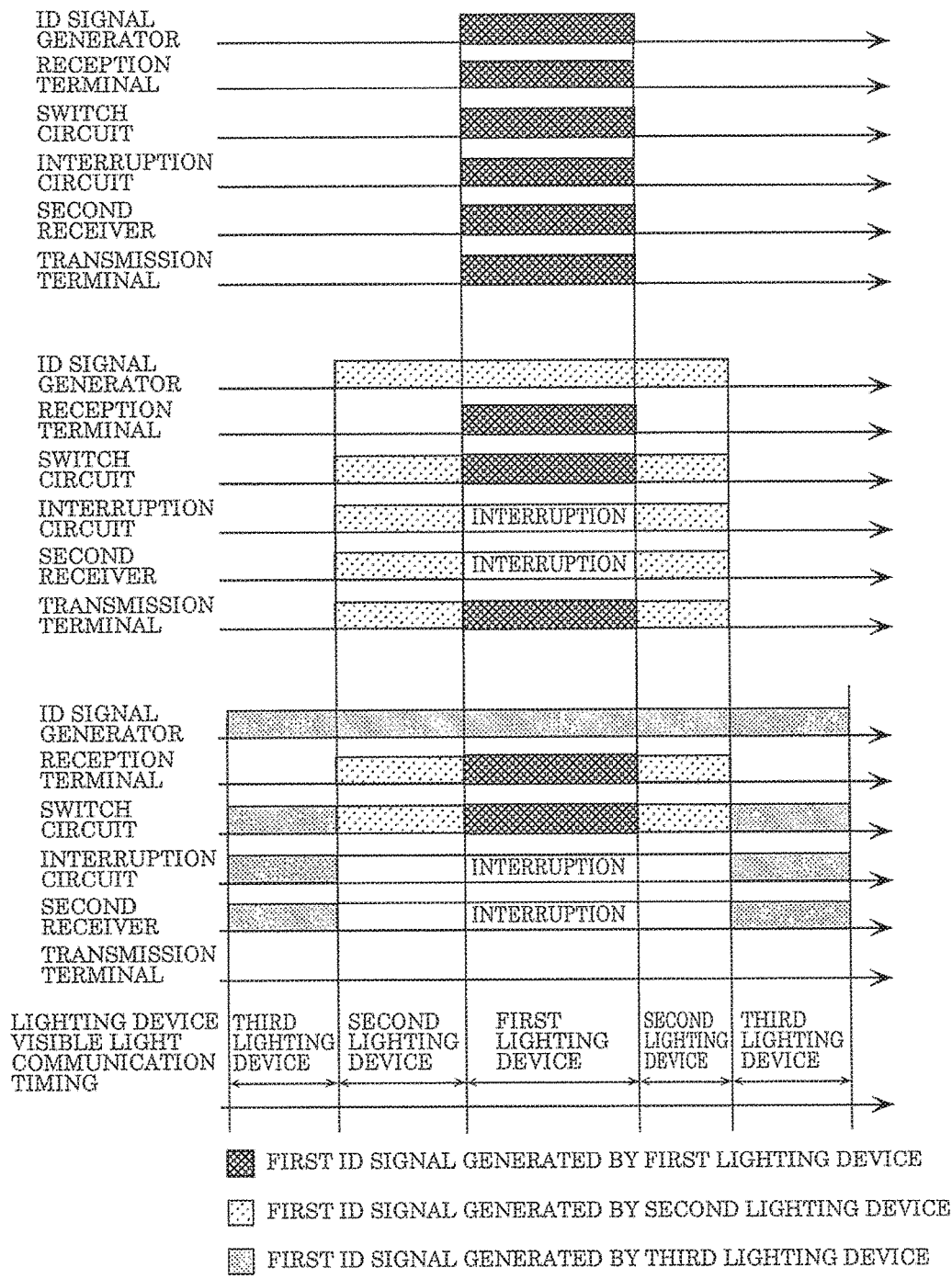
FIG. 10 illustrates output signal timing for each element when the modulation devices of lighting devices according to Embodiment 2 operate.

FIG. 10 illustrates output signal timing for each element when modulation device 4A of each of lighting devices 200a, 200b, and 200c operates, As illustrated in FIG. 10, the first ID signal generated by first lighting device 200a is transmitted over a shorter period of time than the first ID signal generated by second lighting device 200b and the first ID signal generated by third lighting device 200c, and is also transmitted the latest among the three. The first ID signal generated by second lighting device 200b is transmitted at an earlier point in time than the first ID signal generated by first lighting device 200a, and is transmitted over a longer period of time. The first ID signal generated by third, lighting device 200c is transmitted at an earlier point in time than the first ID signal generated by second lighting device 200b, and is transmitted over a longer period of time.

Note that the first ID signal output by each of lighting devices 200a, 200b, and 200c may be repeatedly transmitted on a predetermined cycle while maintaining the above relationship.

ID signal generator 92 of first lighting device 200a generates and outputs the first ID signal for a predetermined period of time, and at a predetermined point in time.

Reception terminal 10 of first lighting device 200a is not connected to any other lighting device, so reception terminal 10 does not receive an external ID signal.

Since the detection result of detector 93 of first lighting device 200a is always the unreceived state, switch circuit 13 of first lighting device 200a outputs the generated first ID signal to transmission terminal 11 and second receiver 84.

Since the detection result of detector 93 of first lighting device 200a is always the unreceived state, interruption circuit 60 of first lighting device 200a outputs the generated first ID signal to second receiver 84.

As a result, second receiver 84 and transmission terminal 11 of first lighting device 200a receive the first ID signal at the same time. Then, when the first ID signal is output from second receiver 84, a switch drive signal based on the first ID signal is input into lamp 3 of first lighting device 200a from modulator 85. With this, visible light communication by lamp 3 of first lighting device 200a based on the first ID signal is only performed when first ID signal is generated.

ID signal generator 92 of second lighting device 200b generates and outputs the first ID signal for a predetermined period of time, and at a predetermined point in time.

Reception terminal 10 of second lighting device 200b outputs the first ID signal generated by first lighting device 200a only when reception terminal 10 receives the first ID signal from first lighting device 200a. Note second lighting device 200b recognizes the first ID signal generated by first lighting device 200a as a second ID signal.

When the detection result of detector 93 of second lighting device 200b is the unreceived state, switch circuit 13 of second lighting device 200b outputs the first ID signal generated by second lighting device 200b to transmission terminal 11 and interruption circuit 60. However, when the detection result of detector 93 of second lighting device 200b is the received state, switch circuit 13 outputs the first ID signal generated by first lighting device 200a to transmission terminal 11 and interruption circuit 60.

As a result, transmission terminal 11 of second lighting device 200b outputs the same ID signal at the same time as switch circuit 13.

When the detection result of detector 93 of second lighting device 200b is the unreceived state, interruption circuit 60 of second lighting device 200b outputs the first ID signal generated by second lighting device 200b to second receiver 84. However, when the detection result of detector 93 of second lighting device 200b is the received state, interruption circuit 60 interrupts the first ID signal generated by second lighting device 200b.

As a result, second receiver 84 of second lighting device 200b and interruption circuit 60 output the first ID signal generated by second lighting device 200b at the same time, whereby the signal is interrupted at the same time. Then, in second lighting device 200b, when the first ID signal generated by second lighting device 200b is output from second receiver 84 to modulator 85, a switch drive signal based on the first ID signal generated by second lighting device 200b is input into lamp 3 from modulator 85. With this, visible light communication by lamp 3 of second lighting device 200b based on the first ID signal generated by second lighting device 200b is only performed when first ID signal is generated.

ID signal generator 92 of third lighting device 200c generates and outputs the first ID signal for a predetermined period of time, and at a predetermined point in time.

Reception terminal 10 of third lighting device 200c outputs the first ID signals generated by first lighting device 200a and second lighting device 200b only when reception terminal 10 receives, from second lighting device 200b, the first ID signals generated by first lighting device 200a and second lighting device 200b. Note third lighting device 200c recognizes the first ID signals generated by first lighting device 200a and second lighting device 200b as second ID signals.

When the detection result of detector 93 of third lighting device 200c is the unreceived state, switch circuit 13 of third lighting device 200c outputs the first ID signal generated by third lighting device 200c to transmission terminal 11 and interruption circuit 60. However, when the detection result of detector 93 of third lighting device 200c is the received state, switch circuit 13 outputs the first ID signals generated by first lighting device 200a and second lighting device 200b to transmission terminal 11 and interruption circuit 60.

As a result, transmission terminal 11 of third lighting device 200c is capable of outputting an ID signal at the same time as switch circuit 13, but in Embodiment 2, since no other lighting device is connected to transmission terminal 11, an ID signal is not output to another lighting device.

When the detection result of detector 93 of third lighting device 200c is the unreceived state, interruption circuit 60 of third lighting device 200c outputs the first ID signal generated by third lighting device 200c to second receiver 84. However, when the detection result of detector 93 of third lighting device 200c is the received state, interruption circuit 60 interrupts the first ID signals generated by first lighting device 200a and second lighting device 200b.

As a result, second receiver 84 of third lighting device 200c and interruption circuit 60 output the first ID signal generated by third lighting device 200c at the same time, whereby the above signals are interrupted at the same time. Then, in third lighting device 200c, when the first ID signal generated by third lighting device 200c is output from second receiver 84 to modulator 85, a switch drive signal based on the first ID signal generated by third lighting device 200c is input into lamp 3 from modulator 85. With this, lamp 3 of third lighting device 200c performs visible light communication based on the first ID signal generated by third lighting device 200c.

As illustrated in FIG. 10, looking at the visible light communication timing of lighting devices 200a, 200b, and 200c, the visible light communication performed by each is time-shared.

As described above, according to Embodiment 2, when detector detects the unreceived state, interruption circuit 60 passes a signal output from switch circuit 13 to modulator 85. When detector 93 detects the unreceived state, interruption circuit 60 interrupts the signal output from switch circuit 13 to modulator 85. Thus, as described above, lighting devices 200a, 200b, and 200c are capable of performing time-shared visible light communication. So long as time-shared visible light communication is possible, accurate visible light communication free of interference is possible even when lighting ranges H1, H2, and H3 of lighting devices 2001, 200b, and 200c overlap and each of lighting devices 200a, 200b, and 200c performs visible light communication based on a different ID signal.

Other Embodiments

The lighting device has been described according to exemplary embodiments, but the present disclosure is not limited to the above embodiments. Note that in the following examples, elements equivalent to those in Embodiment 1 and 2 share like reference numerals and description of such elements is omitted.

In the example given in Embodiment 1 described above, modulation devices 4 of lighting devices 1a, 1b, and 1c are connected to lines 30 and 31, but modulation devices 4 may communicate with one another via wireless communication devices.

Figure 11:
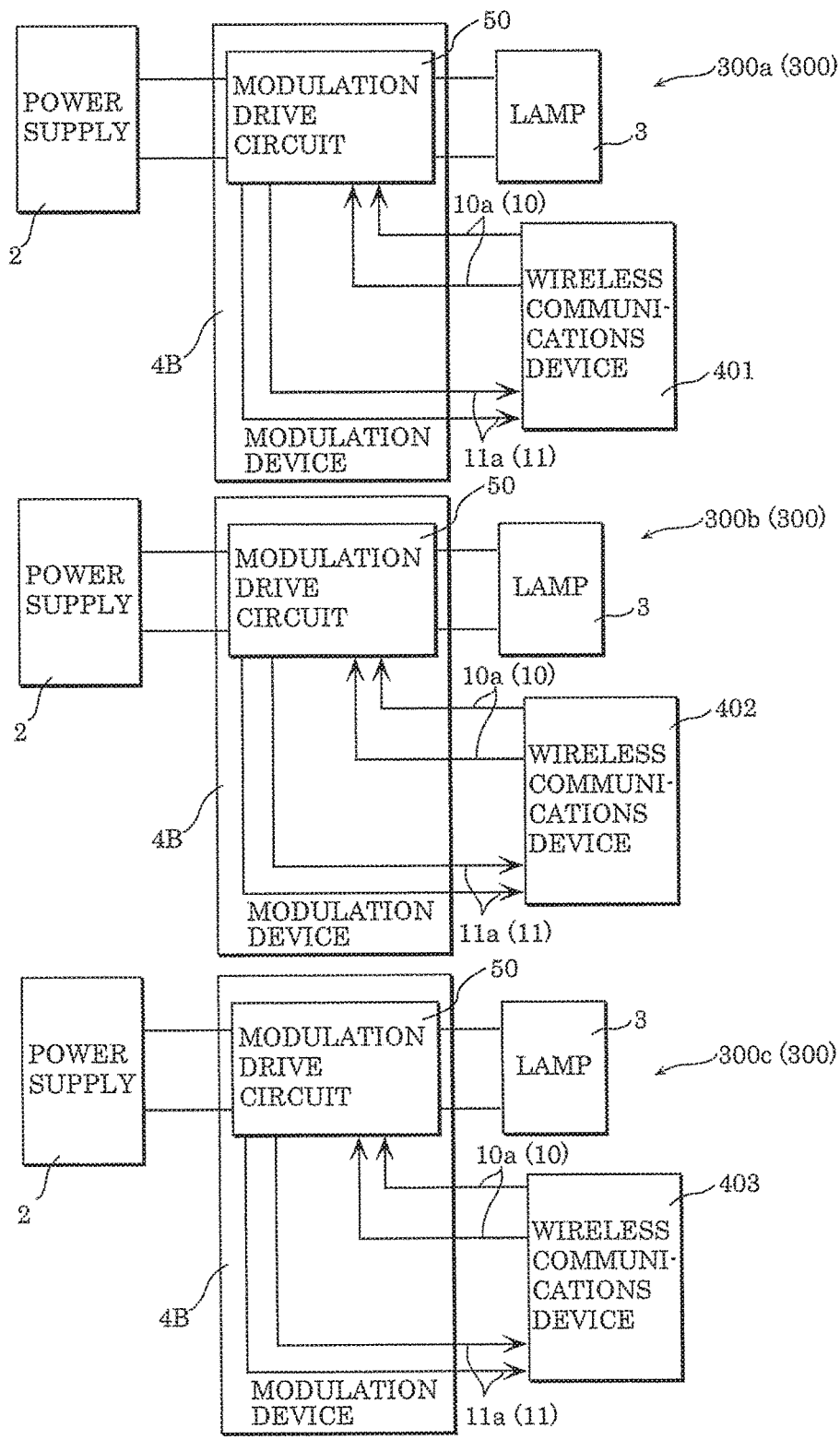
FIG. 11 schematically illustrates three lighting devices connected by wireless communication devices so as to be able to communicate with one another, according to a variation example.

FIG. 11 schematically illustrates three lighting devices connected by wireless communication devices so as to be able to communicate with one another.

As illustrated in FIG. 11, terminal pair 10a of reception terminal 10 of first lighting device 300a and terminal pair 11a of transmission terminal 11 are connected to wireless communication device 401. Terminal pair 10a of reception terminal 10 of second lighting device 300b and terminal pair 11a of transmission terminal 11 are connected to wireless communication device 402. Terminal pair 10a of reception terminal 10 of third lighting device 300c and terminal pair 11a of transmission terminal 11 are connected to wireless communication device 403.

Examples of types of wireless communication performed by wireless communications device 401, 402, and 403 include communication over radio waves, electromagnetic waves, light waves, and sound waves. Wireless communication device 401 and wireless communication device 402 are capable of communicating with one another, and wireless communication device 402 and wireless communication device 403 are capable of communicating with one another.

With this, so long as modulation devices 4B of lighting devices 300a, 300b, and 300c are capable of communicating with one another by way of wireless communication between wireless communication devices 401, 402, and 403, even if lighting devices 300a, 300b, and 300c are disposed far apart from one another, transmission signal waveform distortion can be inhibited. Furthermore, electrical insulation in modulation devices 413 can be preserved even if the photocouplers are removed.

Moreover, in the examples given in Embodiments 1 and 2, three lighting devices 1 and 200, respectively, are connected together in series, but a configuration in which a plurality of lighting devices 1 and 200 are respectively connected is acceptable, such as two or four or more.

Furthermore, Embodiment 1, Embodiment 2, and the variation example may be combined.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

What is claimed is:

1. A modulation device that modulates current to be supplied to a lamp of a lighting device capable of visible light communication, the modulation device comprising:
a modulation ID (identification) signal generator that generates a first ID signal, including first identification information, for modulating the current;
a reception terminal for receiving, from outside the modulation device, a second ID signal, including second identification information, for modulating the current;
a transmission terminal for transmitting the first ID signal and the second ID signal out of the modulation device;
a detector that detects a received state in which the second ID signal is received by the reception terminal and an unreceived state in which the second ID signal is not received by the reception terminal; and
a switch circuit that outputs the first ID signal to the transmission terminal when the detector detects the unreceived state and outputs the second ID signal to the transmission terminal when the detector detects the received state.

2. The modulation device according to claim 1, further comprising a modulator circuit that, in accordance with one of the first ID signal and the second ID signal input via the switch circuit, modulates the current to be supplied to the lamp,
wherein the switch circuit outputs the first ID signal to the modulator circuit and to the transmission terminal when the detector detects the unreceived state and outputs the second signal to the modulator circuit and to the transmission terminal when the detector detects the received state.

3. The modulation device according to claim 2, further comprising an interruption circuit that, in accordance with a detection result of the detector, interrupts a signal output from the switch circuit to the modulator circuit,
wherein when the detector detects the unreceived state, the interruption circuit passes the first ID signal output from the switch circuit to the modulator circuit, and when the detector detects the received state, the interruption circuit interrupts the second ID signal output from the switch circuit to the modulator circuit.

4. The modulation device according to claim 1, further comprising a photocoupler that transmits, to the detector, the second ID signal received by the reception terminal.

5. The modulation device according to claim 1, wherein at least one of the reception terminal and the transmission terminal is connected to an optical fiber connected to another modulation device.

6. The modulation device according to claim 3, wherein at least one of the reception terminal and the transmission terminal is connected to a wireless communication device for communicating with another modulation device.

7. A lighting device, comprising:
the modulation device according to claim 1; and
the lamp.

8. A modulation device that modulates current to be supplied to a lamp of a lighting device capable of visible light communication, the modulation device comprising:
a modulation ID (identification) signal generator that generates a first ID signal, including first identification information, for modulating the current;
a reception terminal for receiving, from outside the modulation device, a second ID signal, including second identification information, for modulating the current;
a transmission terminal for transmitting the first ID signal and the second ID signal out of the modulation device;
a detector that detects a received state in which the second ID signal is received by the reception terminal and an unreceived state in which the second ID signal is not received by the reception terminal;
a switch circuit that outputs the first ID signal to the transmission terminal when the detector detects the unreceived state and outputs the second ID signal to the transmission terminal when the detector detects the received state; and
a modulator circuit that, in accordance with one of the first ID signal and the second ID signal input via the switch circuit, modulates the current to be supplied to the lamp,
wherein the switch circuit outputs the first ID signal to the modulator circuit and to the transmission terminal when the detector detects the unreceived state and outputs the second signal to the modulator circuit and to the transmission terminal when the detector detects the received state.

9. A modulation device that modulates current to be supplied to a lamp of a lighting device capable of visible light communication, the modulation device comprising:
a modulation ID (identification) signal generator that generates a first ID signal, including first identification information, for modulating the current;
a reception terminal for receiving, from outside the modulation device, a second ID signal, including second identification information, for modulating the current;
a transmission terminal for transmitting the first ID signal and the second ID signal out of the modulation device;
a detector that detects a received state in which the second. ID signal is received by the reception terminal and an unreceived state in which the second ID signal is not received by the reception terminal;
a switch circuit that outputs the first ID signal to the transmission terminal when the detector detects the unreceived state and outputs the second ID signal to the transmission terminal when the detector detects the received state;

a modulator circuit that, in accordance with one of the first ID signal and the second ID signal input via the switch circuit, modulates the current to be supplied to the lamp; and an interruption circuit that, in accordance with a detection result of the detector, interrupts a signal output from the switch circuit to the modulator circuit, wherein the switch circuit outputs the first ID signal to the modulator circuit and to the transmission terminal when the detector detects the unreceived state and outputs the second signal to the modulator circuit and to the transmission terminal when the detector detects the received state, and when the detector detects the unreceived state, the interruption circuit passes the first ID signal output from the switch circuit to the modulator circuit, and when the detector detects the received state, the interruption circuit interrupts the second ID signal output from the switch circuit to the modulator circuit.

* * * * *